(12) United States Patent
Lee

(10) Patent No.: US 11,833,464 B2
(45) Date of Patent: *Dec. 5, 2023

(54) CONDUCTIVE FILTER UNIT, CONDUCTIVE FILTER MODULE INCLUDING CONDUCTIVE FILTER UNIT, AND FINE DUST REMOVAL SYSTEM INCLUDING CONDUCTIVE FILTER MODULE

(71) Applicant: ALINK CO., LTD, Changwon-si (KR)

(72) Inventor: Hye Moon Lee, Changwon-si (KR)

(73) Assignee: ALINK CO., LTD, Changwon-si (KR)

( * ) Notice: Subject to any disclaimer, the term of this patent is extended or adjusted under 35 U.S.C. 154(b) by 180 days.

This patent is subject to a terminal disclaimer.

(21) Appl. No.: 17/283,783

(22) PCT Filed: Oct. 10, 2019

(86) PCT No.: PCT/KR2019/013252
§ 371 (c)(1),
(2) Date: Apr. 8, 2021

(87) PCT Pub. No.: WO2020/076076
PCT Pub. Date: Apr. 16, 2020

(65) Prior Publication Data
US 2022/0258087 A1 Aug. 18, 2022

(30) Foreign Application Priority Data
Oct. 10, 2018 (KR) .................. 10-2018-0120335

(51) Int. Cl.
*B01D 46/00* (2022.01)
*B01D 39/20* (2006.01)

(52) U.S. Cl.
CPC ..... *B01D 46/0032* (2013.01); *B01D 39/2031* (2013.01); *B01D 39/2041* (2013.01);
(Continued)

(58) Field of Classification Search
CPC ............ B01D 46/0032; B01D 46/0041; B01D 46/2403; B01D 46/50; B01D 39/04;
(Continued)

(56) References Cited

U.S. PATENT DOCUMENTS 6,454,839 B1 9/2002 Hagglund
7,198,762 B1 * 4/2007 Teboul .................. B01D 53/92
422/177

(Continued)

FOREIGN PATENT DOCUMENTS

AU         667949 B2 *  4/1994 ........... F01N 3/0275
CN      102859289 A      1/2013
(Continued)

OTHER PUBLICATIONS

WO2016136270A1_ENG (Espacenet machine translation of Hirosi) (Year: 2016).*
(Continued)

*Primary Examiner* — Gabriel E Gitman
(74) *Attorney, Agent, or Firm* — Maschoff Brennan

(57) ABSTRACT

The present invention relates to: a conductive filter unit provided with an electrode rod including a conductive member protruding from a second electrode cap to the inner space formed by a conductive filter and a metal member arranged on at least part of the surface of the conductive member; a conductive filter module including same; and a fine dust removal system provided with the conductive filter module, wherein the fine dust removal system provided with the conductive filter module generates a strong electric field and a large number of ions between a particle charging device and the conductive filter to increase the charge rate of fine dust, thereby realizing high efficiency of fine dust removal.

10 Claims, 14 Drawing Sheets

(52) U.S. Cl.
CPC .. *B01D 46/0041* (2013.01); *B01D 2239/0241* (2013.01); *B01D 2239/1225* (2013.01); *B01D 2239/1241* (2013.01); *B01D 2273/30* (2013.01)

(58) Field of Classification Search
CPC .... B01D 39/06; B01D 39/083; B01D 39/086; B01D 39/1615; B01D 39/1623; B01D 39/18; B01D 39/2017; B01D 39/2403; B01D 39/2031; B01D 39/2041; B01D 2239/0241; B01D 2239/0471; B01D 2239/1225; B01D 2239/1241; B01D 2273/30; B01D 53/32; B01D 53/323; B01D 35/06; B01D 2259/818; B01D 46/2414; B01D 39/12; B03C 3/00; B03C 3/04; B03C 3/06; B03C 3/155; B03C 3/51; B03C 3/32; B03C 3/36; B03C 3/40; B03C 3/41; B03C 3/45; B03C 3/49; B03C 3/86; B03C 2201/00; B03C 2201/08; B03C 3/017; B03C 3/12; B03C 3/38; B03C 2201/04; B03C 2201/06; F24F 8/30; F24F 8/192; F24F 13/10; F24F 8/80; F24F 13/20; F01N 3/01
See application file for complete search history.

(56) References Cited

U.S. PATENT DOCUMENTS

| | | | |
|---|---|---|---|
| 8,465,574 B2 | 6/2013 | Horne | |
| 8,529,652 B2* | 9/2013 | Burkhardt | F01N 3/022 422/177 |
| 10,173,172 B2 | 1/2019 | Hartbrich et al. | |
| 11,484,888 B2* | 11/2022 | Lee | B03C 3/455 |
| 2004/0226449 A1 | 11/2004 | Heckel et al. | |
| 2005/0231884 A1* | 10/2005 | Miyaishi | B03C 3/32 361/231 |
| 2006/0150810 A1* | 7/2006 | Kukla | F01N 3/01 95/55 |
| 2009/0151567 A1 | 6/2009 | Krigmont | |
| 2009/0151568 A1 | 6/2009 | Krigmont | |
| 2011/0011265 A1 | 1/2011 | Paur et al. | |
| 2016/0046818 A1* | 2/2016 | Lee | H05K 1/092 252/519.3 |
| 2017/0232386 A1 | 8/2017 | Hartbrich et al. | |

FOREIGN PATENT DOCUMENTS

| | | | | |
|---|---|---|---|---|
| EP | 1131162 | | 9/2001 | |
| FR | 2861802 A1 | | 5/2005 | |
| FR | 2915234 A1 | * | 10/2008 | ............... B03C 3/86 |
| JP | H07-121372 B2 | | 12/1995 | |
| JP | 2002047914 A | | 2/2002 | |
| JP | 2004355885 A | * | 12/2004 | |
| JP | 5198701 B2 | | 5/2013 | |
| KR | 10-2006-0080599 A | | 7/2006 | |
| KR | 10-2011-0032647 A | | 3/2011 | |
| KR | 10-2011-0128465 A | | 11/2011 | |
| KR | 10-2012-0027543 A | | 3/2012 | |
| KR | 20-2014-0002280 U | | 4/2014 | |
| KR | 10-1506324 B1 | | 3/2015 | |
| KR | 10-1579668 B1 | | 12/2015 | |
| KR | 10-2016-0078239 A | | 7/2016 | |
| KR | 10-2016-0115211 A | | 10/2016 | |
| KR | 10-2018-0076711 A | | 10/2016 | |
| KR | 10-2016-0143049 A | | 12/2016 | |
| KR | 10-2017-0095746 A | | 8/2017 | |
| KR | 10-1849459 B1 | | 4/2018 | |
| WO | 00/30755 | | 6/2000 | |
| WO | 2007116131 A1 | | 10/2007 | |
| WO | 2011132995 A2 | | 10/2011 | |
| WO | 2014/204310 A1 | | 12/2014 | |
| WO | WO-2016136270 A1 | * | 9/2016 | ............... B03C 3/40 |

OTHER PUBLICATIONS

WO2016136270A1_ENG (Espacenet machine translation of Hirosi) (Year: 2016).*

JP2004355885A_ENG (Espacenet machine translation of Horiguchi) (Year: 2004).*

FR2915234A1_ENG (Espacenet machine translation of Loming) (Year: 2008).*

KR Office Action dated Aug. 14, 2019 as received in Application No. 10-2018-0120335.

KR Decision to Grant dated Jan. 8, 2020 as received in Application No. 10-2018-0120335.

* cited by examiner

CONDUCTIVE FILTER UNIT, CONDUCTIVE FILTER MODULE INCLUDING CONDUCTIVE FILTER UNIT, AND FINE DUST REMOVAL SYSTEM INCLUDING CONDUCTIVE FILTER MODULE

CROSS-REFERENCE TO RELATED APPLICATION

This application claims priority under 35 U.S.C. § 119 to Korean Patent Application No. 10-2018-0120335, filed on Oct. 10, 2018, in the Korean Intellectual Property Office (KIPO), the disclosure of which is incorporated by reference herein in its entirety.

TECHNICAL FIELD

The present disclosure relates to a conductive filter unit, a conductive filter module including the conductive filter unit, and a fine dust removal system including the conductive filter module, and more particularly, to a fine dust removal system provided with a conductive filter module that may generate a strong electric field and a large number of ions between a particle charging device and a conductive filter to increase a charge rate of fine dust, thereby realizing high efficiency of fine dust removal, where the conductive filter unit is provided with an electrode rod including a conductive member protruding from a second electrode cap to an inner space formed by a conductive filter and a metal member arranged on at least part of the surface of the conductive member.

DISCUSSION OF RELATED ART

Because of its small size, fine dust may penetrate deep into the alveoli while not getting caught in the mouth or nasal bronchi during human breathing and has optical properties such as refraction and scattering of light, thus causing large obstacles to securing vision. In addition, since fine dust contains many organic and inorganic harmful substances, fine dust that has infiltrated into the lungs remains in the lungs and delivers various organic and inorganic harmful substances contained therein to the human body, resulting in significantly serious respiratory diseases such as pneumonia, lung cancer, and bronchitis.

Fine dust is generated by not only a mobile pollutant source such as automobiles in Korea, but also a static pollutant source generated by household heating and industrial energy consumption, as well as yellow dust from the Gobi Desert in China, and the recent large-scale industrialization of China, and a lot of difficulties are caused not only outdoors but also indoors throughout the entire East Asia.

Most of air filtration devices that remove fine dust in the room are using a filter. Among the filters used to remove fine dust, a HEPA filter shows a high fine dust filtration rate capable of trapping 99.97% of fine dust with a diameter of about 0.3 µm.

Although the HEPA filter is significantly effective in removing fine dust, the air penetration efficiency of the filter is significantly low because nano-sized fine polymers or glass fibers are significantly tightly entangled. That is, the pressure loss is significantly large. Accordingly, when the HEPA filter is used in an air cleaning system that removes fine dust, a large-capacity fan (e.g., blower, ventilator, etc.) is required, and the resulting driving power consumption is large, and the resulting noise and vibration are severe, so there is a disadvantage that additional equipment for sound and vibration prevention is required. In addition, since used HEPA filters cannot be reused, there is a hassle of having to replace them every 6 to 12 months.

In recent years, various functional filter materials have been introduced to compensate for the shortcomings of the HEPA filter. As a representative filter material, there is an electret (e.g., electrostatic) filter that effectively collects fine dust in the air through electrostatic force because the filter material itself has a positive or negative charge. However, the electric charge characteristic of the electret filter disappears as dust is collected and accumulated, and the electric charge characteristic easily disappears even if it is not used for collecting particulate contaminants and merely stored for a long time. Even when the surface of the electret filter is exposed to water or alcohol, the charge characteristic is quite easily removed, so that the ability to remove fine dust is remarkably deteriorated.

To solve the problem that the charge characteristics of the electret filter disappear or deteriorate naturally or easily due to external damage over time, an air purifying filter has been developed in which conductive filters are overlapped at the top and bottom of the filter with dielectric characteristics and a dielectric filter agent is electrically polarized by respectively applying positive and negative or negative and positive high voltages so as to electrostatically activate it (Patent Publication No. 10-2011-0128465). However, such a filter still has a problem in that the filter has to be made in three layers in the manufacturing process and a high pressure loss occurs due to the layered filter.

In addition, a method that may remove fine dust significantly effectively by applying a conductive filter into an electrostatic dust collecting system in which a metal is coated on a general nonwoven filter with a pressure loss of ⅕ to 1/20 of that of a regular HEPA filter has also been introduced (ACS Appl. Mater. Interfaces 2017, 9, 16495-16504). It is a method of coating metal on a filter material having characteristics of low pressure loss to give high electrical conductivity and maximize the electric field with charged fine particles, thereby solving the high pressure loss problem of HEPA filters. In such a method, although the pressure loss is about 1/10 of the HEPA filter, fine dust may be removed at the same level as the HEPA filter.

However, when a filter bending scheme, which is generally applied to purify a large amount of air in a certain volume of space, is applied to a conductive filter coated with metal, a uniform electric field is not formed, so electrical attraction between the electrically charged fine dust and the conductive filter does not occur properly and thus the removal of fine dust is hardly performed. That is, in order to purify a large amount of air containing fine dust by using a conductive filter material capable of maintaining low pressure loss, a new filter module should be provided instead of the conventional filter bending method.

Meanwhile, a small amount of ions are generated between a conductive filter and an electrode inside a cylindrical module, and thus the fine dust removal efficiency may be improved only when ions generated by the previous particle charging device (e.g., ionizer) are present inside the cylindrical module. However, the movement of ions generated by the particle charging device is significantly fast, so the probability of extinction of particles by contacting a nearby object is significantly high, and there are not many ions introduced into the cylindrical module. In other words, since only particles charged by ions generated in the particle charging device may be removed from the conductive filter module, there may be a problem that fine dust that is not charged between the particle charging device and the conductive filter module is not removed by the cylindrical conductive filter module.

Accordingly, the present inventors have made intensive research efforts to overcome the problems of the prior art, and found that in the case of a fine dust removal system provided with a cylindrical filter module and a conductive filter unit including an electrode rod that includes a conductive member on which a metal member is disposed, when a filtration speed of air passing through the filter module that is not bent is generally 5 cm/sec, the pressure loss is about 0.5 to 10 pa, which is about 1/20~1/5 of the pressure loss of the general HEPA filter, and it is possible to generate a strong electric field and a large amount of ions between the particle charging device and the conductive filter, thus charging even fine dust that is not charged between the particle charging device and the conductive filter module, and thus a large amount of air including fine dust may be purified with high efficiency.

DETAILED DESCRIPTION OF THE INVENTION

Technical Objectives

Embodiments of the present disclosure are directed to a conductive filter unit having a small pressure loss and capable of implementing high fine dust removal efficiency, and a conductive filter module including the same.

In addition, embodiments of the present disclosure are directed to a fine dust removal system provided with the conductive filter unit and a conductive filter module including the conductive filter unit.

Technical Solution to the Problem

According to an embodiment, a conductive filter unit includes:
- a first electrode cap;
- a second electrode cap;
- a conductive filter connecting the first electrode cap and the second electrode cap to each other and forming an inner space between the first electrode cap and the second electrode cap; and
- an electrode rod including a conductive member protruding from the second electrode cap to the inner space formed by the conductive filter, and a metal member disposed at at least a portion of a surface of the conductive member.

According to an embodiment, a conductive filter module includes:
- a filter securing plate including at least one open air inlet; and
- a conductive filter unit according to claim 1 installed at the filter securing plate.

According to an embodiment, a fine dust removal system provided with a conductive filter module includes:
- a housing;
- a conductive filter module disposed at the housing in a direction of inflow of a contaminated air or discharging of a clean air; and
- a fan disposed at the housing in the direction of inflow of a contaminated air or discharging of a clean air so as to include a flow of air.

Effects of the Invention

According to one or more embodiments of the present disclosure, a conductive filter unit, a conductive filter module including the conductive filter unit, and a fine dust removal system provided with the conductive filter module may uniformly apply an electric field to the inside of the cylindrical conductive filter, thereby providing electric dust collection effects, along with the fine dust collecting mechanism of a general filter, and thus further improving the dust collection effects of the filter.

According to one or more embodiments of the present disclosure, the conductive filter unit, the conductive filter module including the conductive filter unit, and the fine dust removal system provided with the conductive filter module may generate a strong electric field and a large amount of ions between a particle charging device and a conductive filter by disposing a metal member on at least a part of a surface of a conductive member serving as an electrode rod, thereby charging fine dust that is not charged between the particle charging device and the conductive filter module, and thus further improving the dust collection effect of the filter.

According to one or more embodiments of the present disclosure, the conductive filter unit, the conductive filter module including the conductive filter unit, and the fine dust removal system provided with the conductive filter module may generate a large amount of ions to charge fine dust by disposing a metal member on at least a part of a surface of a conductive member serving as an electrode rod and may also induce a strong electric field between the electrode rod and the conductive filter, allowing charging of fine dust and dust collecting to occur simultaneously inside the conductive filter unit without a separate particle charging device, thereby making the fine dust removal system more compact.

According to one or more embodiments of the present disclosure, in the conductive filter unit according to the present disclosure, the conductive filter module including the conductive filter unit, and the fine dust removal system provided with the conductive filter module, the electrode rod provided with a metal member disposed on a surface of the conductive member may have a fine dust removal rate of more than 90%, thus showing excellent fine dust removal effects as compared to an electrode rod having no metal member disposed thereon.

According to one or more embodiments of the present disclosure, as compared to a conventional HEPA filter, in the conductive filter unit according to the present disclosure, the conductive filter module including the conductive filter unit, and the fine dust removal system provided with the conductive filter module, a conductive filter material has a fine dust removal efficiency that is equivalent to that of a HEPA filter which may remove 99.9% or more of fine dust having a particle size of 300 nm, has a pressure loss of about 0.1 to 0.2 times (reduced pressure loss (0.5 Pa to 2 Pa at a filter penetration flow rate of 5 cm/sec)) as compared to the HEPA filter, and has a dust retention effect of 3 times or more as compared to the HEPA filter.

According to one or more embodiments of the present disclosure, the conductive filter unit, the conductive filter module including the conductive filter unit, and the fine dust removal system provided with the conductive filter module may substantially minimize the drive power consumption of the fan by virtue of is reduced pressure loss compared to the fine dust removal efficiency and improved dust retention performance, thereby reducing power consumption and costs and extending the use period by more than two times.

According to one or more embodiments of the present disclosure, the conductive filter unit, the conductive filter module including the conductive filter unit, and the fine dust removal system provided with the conductive filter module may be reused because the conductive filter may be easily separated and cleaned.

According to one or more embodiments of the present disclosure, in the conductive filter unit according to the present disclosure, the conductive filter module including the conductive filter unit, and the fine dust removal system provided with the conductive filter module, an outer housing has a clean air outlet secured and facing toward the indoor at an upper or lower opening of a window, allowing a contaminated air to be introduced into a contaminated air inlet of the fine dust removal system and discharged to the indoor through the clean air outlet after air purification, thereby having the effect of purifying the air.

In addition, according to one or more embodiments of the present disclosure, in the conductive filter unit according to the present disclosure, the conductive filter module including the conductive filter unit, and the fine dust removal system provided with the conductive filter module, an outer housing has a clean air outlet secured to face toward the indoor at a window frame portion where a window is installed, thereby providing versatility that it is possible to secure and install the fine dust removal system at the conventional window frame in which the window is removed without installing a dedicated window.

DETAILED DESCRIPTION

Figure 1:
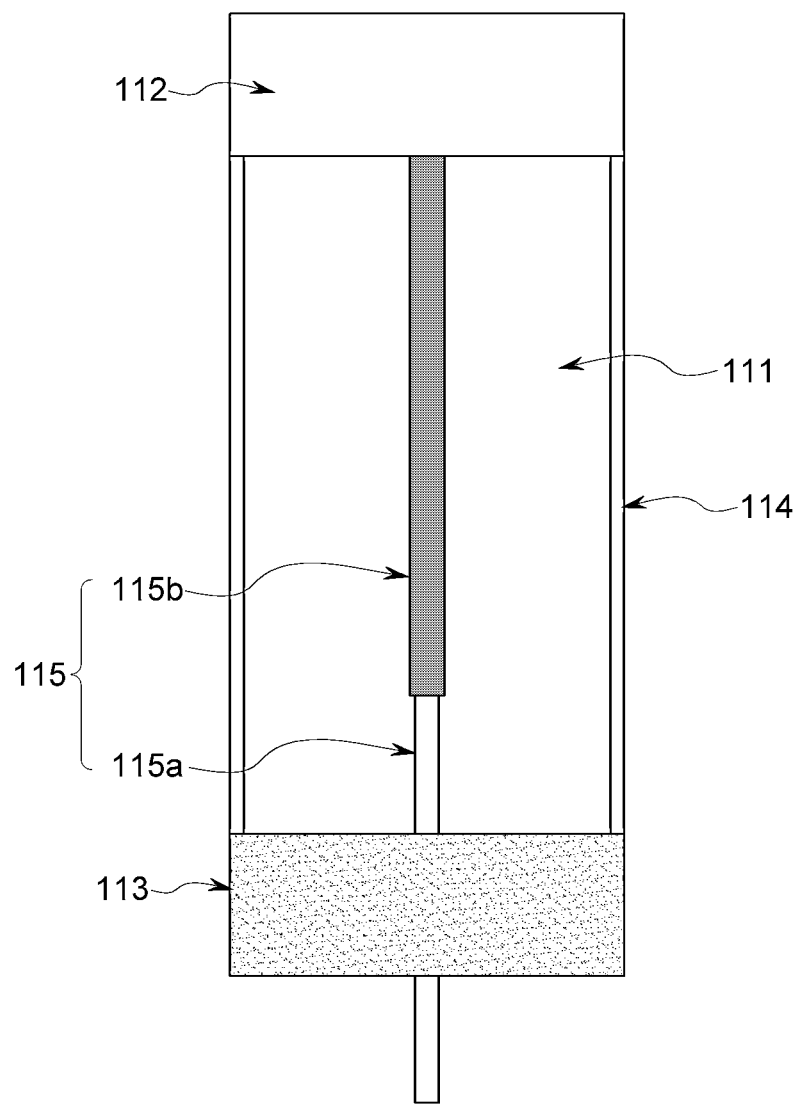
FIGS. 1 and 2 illustrate an electrode rod 115 including a metal member 115b disposed on a part of a surface of a conductive member 115a, and a conductive filter unit 110 including the electrode rod 115 according to an embodiment of the present disclosure.

A conductive filter unit according to an embodiment may include a first electrode cap; a second electrode cap; a conductive filter connecting the first electrode cap and the second electrode cap to each other and forming an inner space between the first electrode cap and the second electrode cap; and an electrode rod including a conductive member protruding from the second electrode cap to the inner space formed by the conductive filter, and a metal member disposed on at least a portion of a surface of the conductive member.

In some embodiments, the metal member disposed at at least a portion of a surface of the conductive member of the conductive filter unit may include at least one of a metal fiber and powder-shaped metal fibers. The metal fiber may have an average longitudinal length in a range from 1 millimeter (mm) to 300 centimeters (cm), and the powder-shaped metal fibers may have an average particle diameter in a range from 1 micrometer (μm) to 1000 μm.

In some embodiments, the electrode rod of the conductive filter unit may protrude extending to the outside of the second electrode cap, and it may protrude at any protruding degree as long as it may be connected to an outer electrode.

In some embodiments, the first electrode cap of the conductive filter unit may be formed to allow air to flow into the inner space of the conductive filter.

In some embodiments, the first electrode cap of the conductive filter unit may be formed in a ring shape.

According to an embodiment, a conductive filter module includes: a filter securing plate including at least one open air inlet; and a conductive filter unit installed at the filter securing plate.

According to an embodiment, a fine dust removal system provided with a conductive filter module includes: a housing; a conductive filter module disposed at the housing in a direction of inflow of a contaminated air or discharging of a clean air; and a fan disposed at the housing in the direction of inflow of a contaminated air or discharging of a clean air, the fan inducing a flow of air.

In some embodiments, the fine dust removal system provided with the conductive filter module may further include a particle charging device disposed at the housing in the direction of inflow of a contaminated air or discharging of a clean air, the fan inducing a flow of air.

In some embodiments, in the fine dust removal system provided with the conduxtive filter module, when the fine dust removal system does not include a particle charging device, the housing in which the conductive filter module and the fan are disposed is disposed in an outer housing in which a contaminated air inlet and a clean air outlet are correspondingly provided.

In some embodiments, in the fine dust removal system provided with the conductive filter module, when the fine dust removal system includes a particle charging device, the housing in which the particle charging device, the conductive filter module and the fan are disposed are disposed is disposed in an outer housing in which a contaminated air inlet and a clean air outlet are correspondingly provided.

In some embodiments, in the fine dust removal system provided with the conductive filter module, one surface of the housing may form a partition wall such that a space is formed between the one surface of the housing and one inner surface of the outer housing provided with the contaminated air inlet, another surface of the housing may form a partition wall such that a space is formed between the another surface of the housing and another inner surface of the outer housing provided with the clean air outlet, a communication path may be formed at a lower portion of the another surface, the particle charging device may be disposed at an upper portion of the one surface of the housing corresponding to the contaminated air inlet, the conductive filter module may be disposed and secured in a direct downward direction from an inner middle portion of the housing, and the fan may be provided in a space between the communication path at the lower portion of the another surface of the housing and the clean air outlet.

In some embodiments, in the fine dust removal system provided with the conductive filter module, the outer housing may be formed such that the clean air outlet is secured at an upper or lower opening of a window to face toward the indoor.

In some embodiments, in the fine dust removal system provided with the conductive filter module, the outer housing may be formed such that the clean air outlet is secured at a window frame of a window to face toward the indoor.

In some embodiments, in the fine dust removal system provided with the conductive filter module, the outer housing may include a first contaminated air inlet and a second contaminated air inlet disposed at two different positions, and a contaminated air introduced by the first contaminated air inlet and the second contaminated air inlet may be selected to be an outdoor air or an indoor air.

In some embodiments, in the fine dust removal system provided with the conductive filter module may further include a damper disposed at each of the first contaminated air inlet and the second contaminated air inlet of the outer housing.

In some embodiments, in the fine dust removal system provided with the conductive filter module, the outer housing may be in the form of a stand on a secured base or a rotating base rotated by a motor.

In some embodiments, in the fine dust removal system provided with the conductive filter module, the outer housing may be provided 50 to 150 cm above a bottom surface.

In some embodiments, in the fine dust removal system provided with the conductive filter module, an air circulating fan serving indoor air circulation may be provided at the housing 50 cm above a bottom surface.

In addition, in some embodiments, upper and lower positions of the air cleaning structure and the air circulation structure may be interchanged as necessary.

Modes for Invention

Hereinafter, it will be described with reference to the drawings according to embodiments of the present disclosure, but this is to facilitate easier understanding of the present disclosure, and the scope of the present disclosure is not limited thereto.

Hereinafter, a conductive filter module 100 and a fine dust removal system 10 including the conductive filter module 100 according to an embodiment of the present disclosure will be described.

First, the conductive filter unit 110 of the present disclosure will be described.

Figure 2:
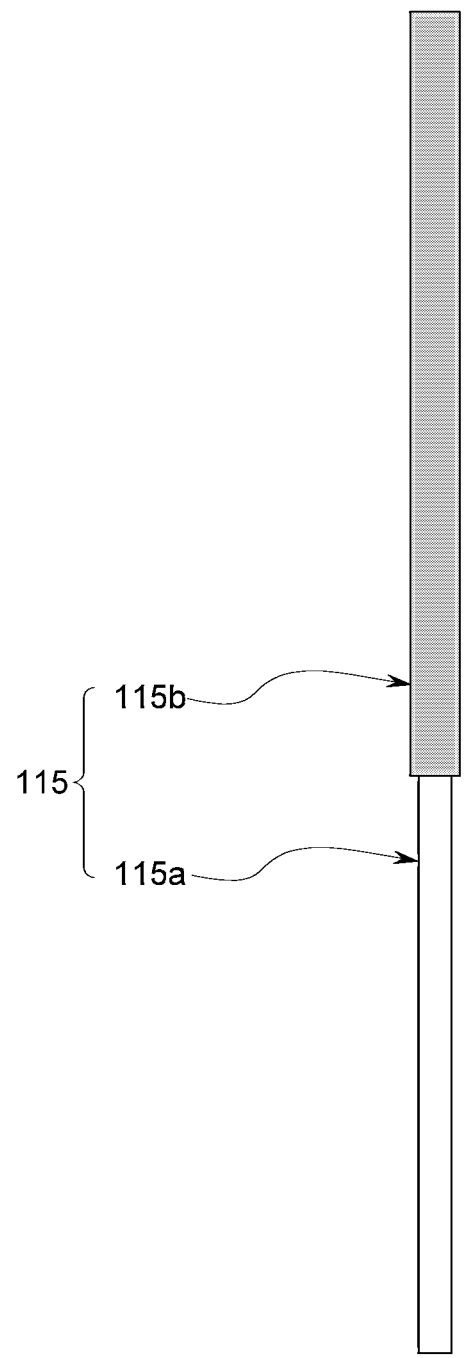
Figure 3:
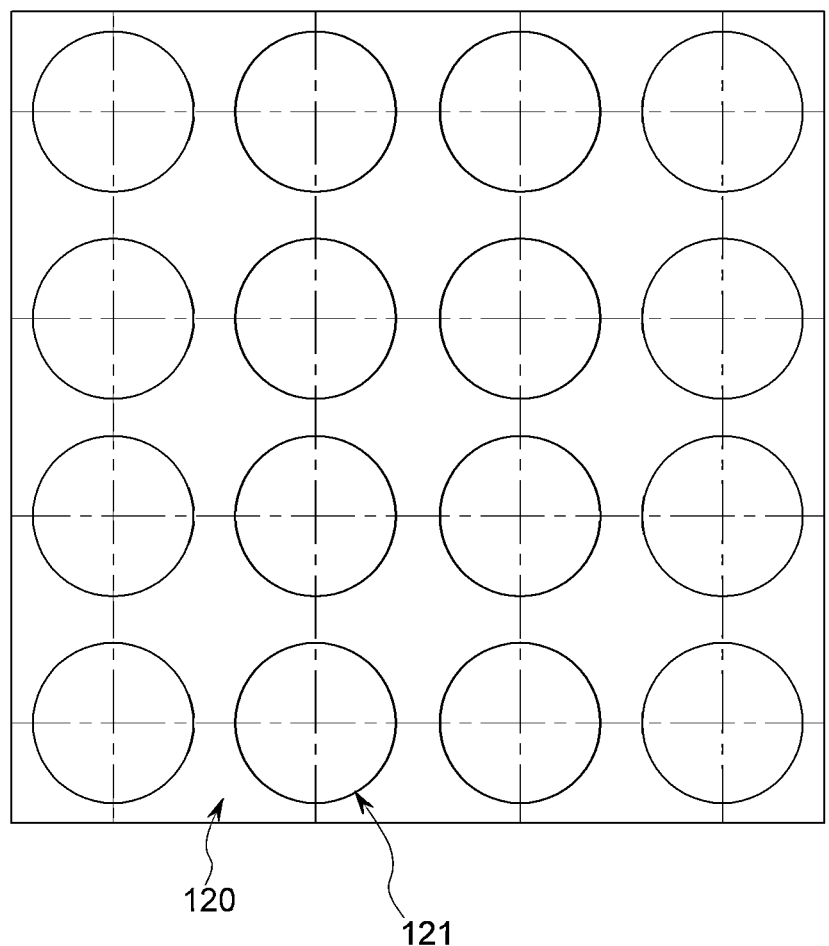
FIGS. 3 and 4 are schematic diagrams illustrating a shape of an upper securing plate constituting the conductive filter module 100 according to an embodiment of the present disclosure.
Figure 4:
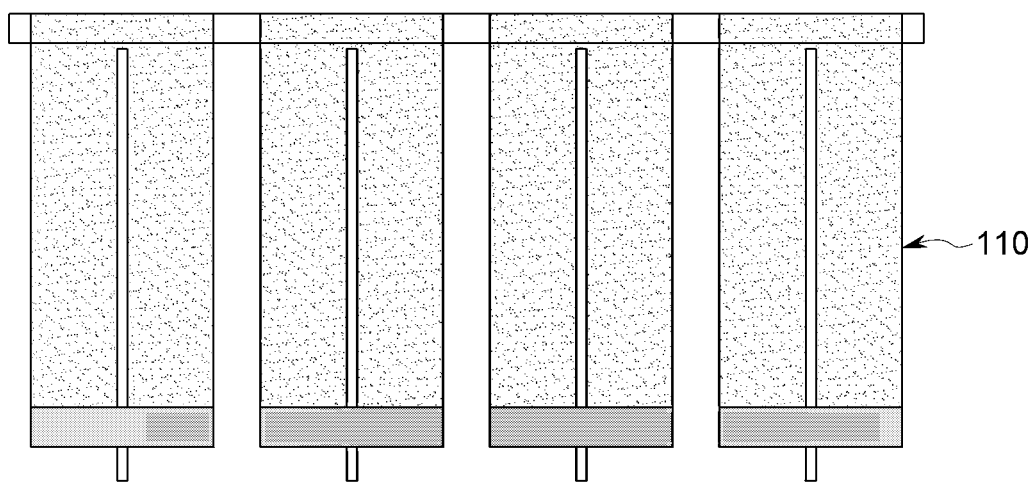
Figure 5:
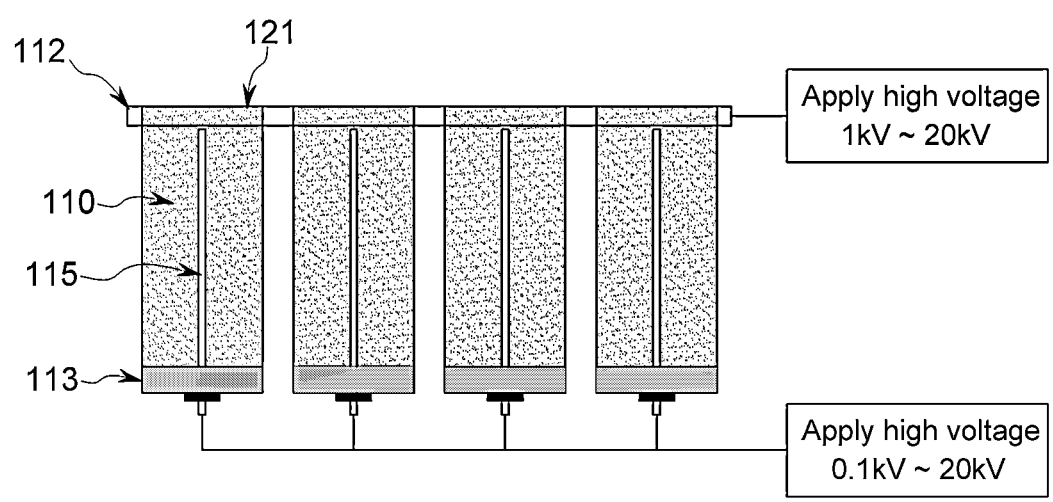
FIGS. 5 to 8 illustrate a method in which a high voltage is applied to the conductive filter module 100 according to an embodiment of the present disclosure.
Figure 6:
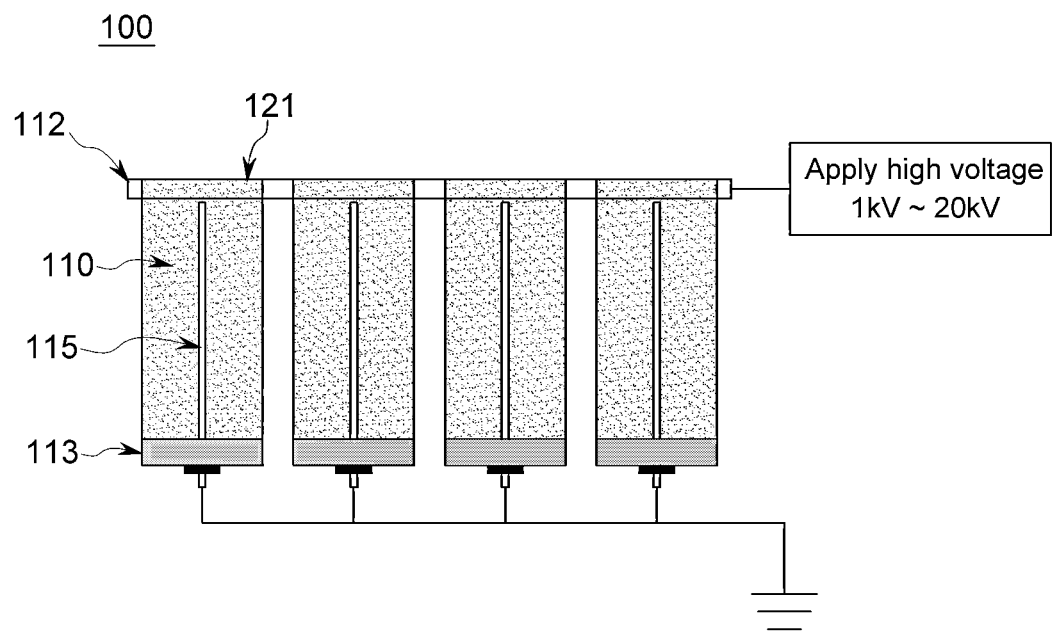
Figure 7:
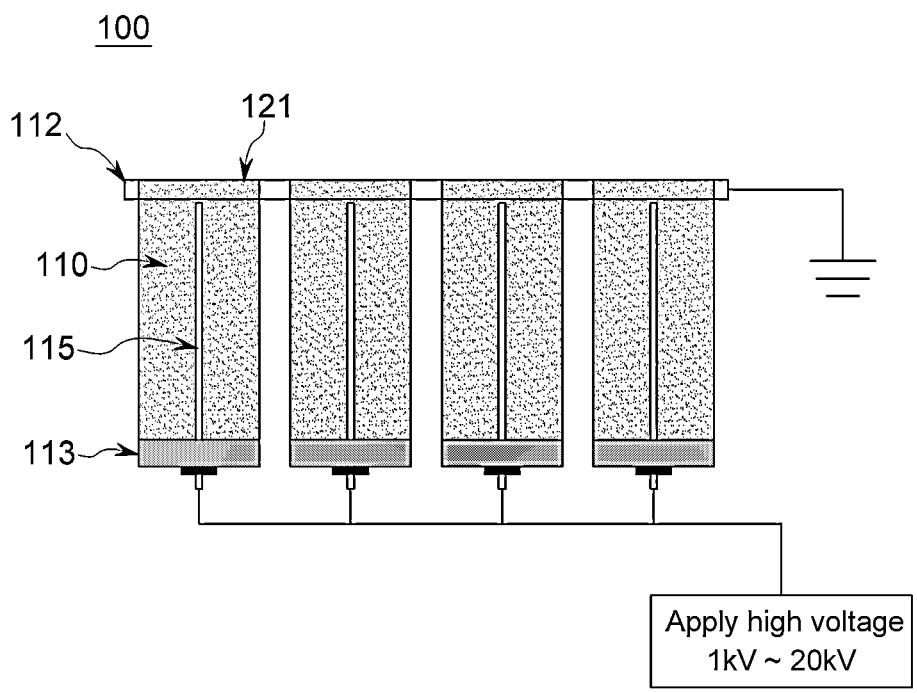
Figure 8:
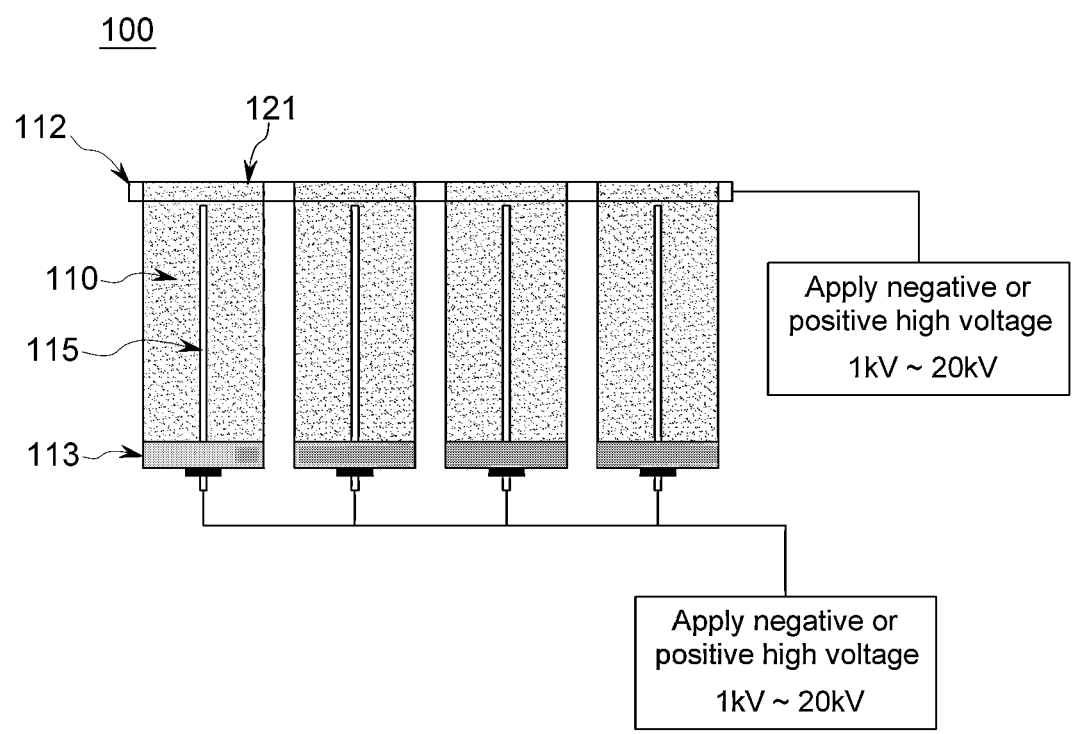
Figure 9:
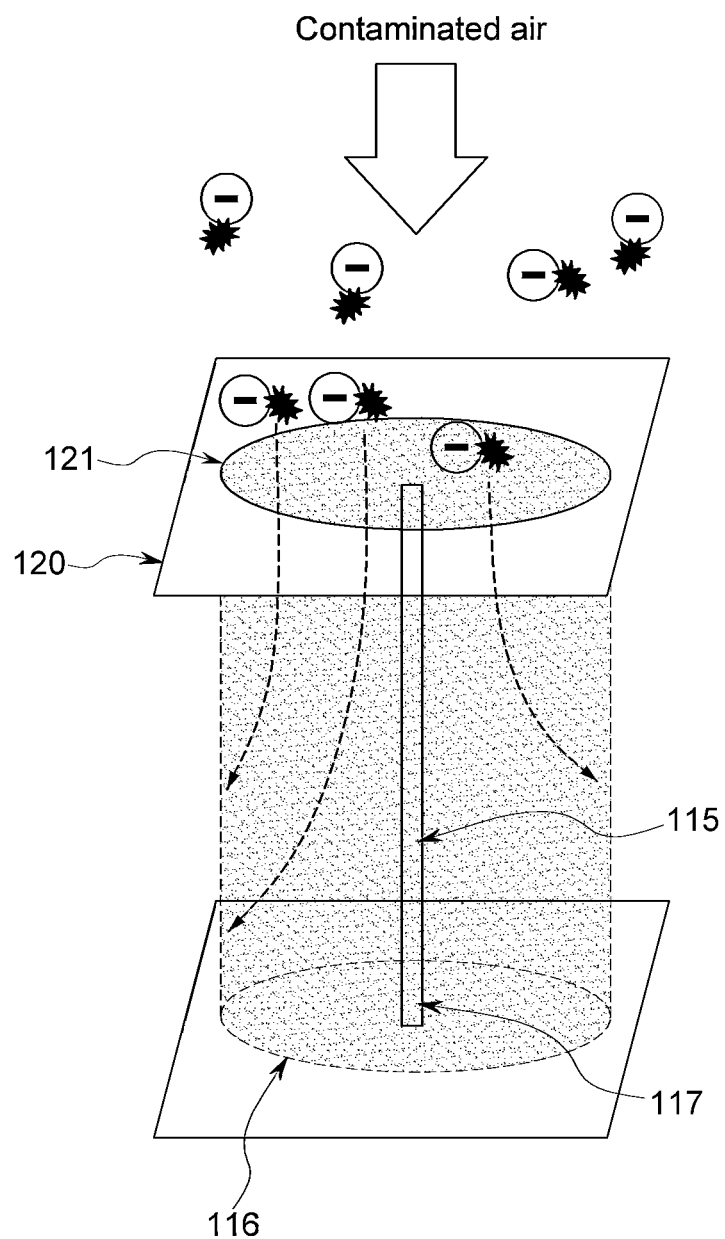
FIGS. 9 to 12 illustrate a mechanism for collecting fine dust when fine dust is introduced into the conductive filter unit 110 according to an embodiment of the present disclosure.
Figure 10:
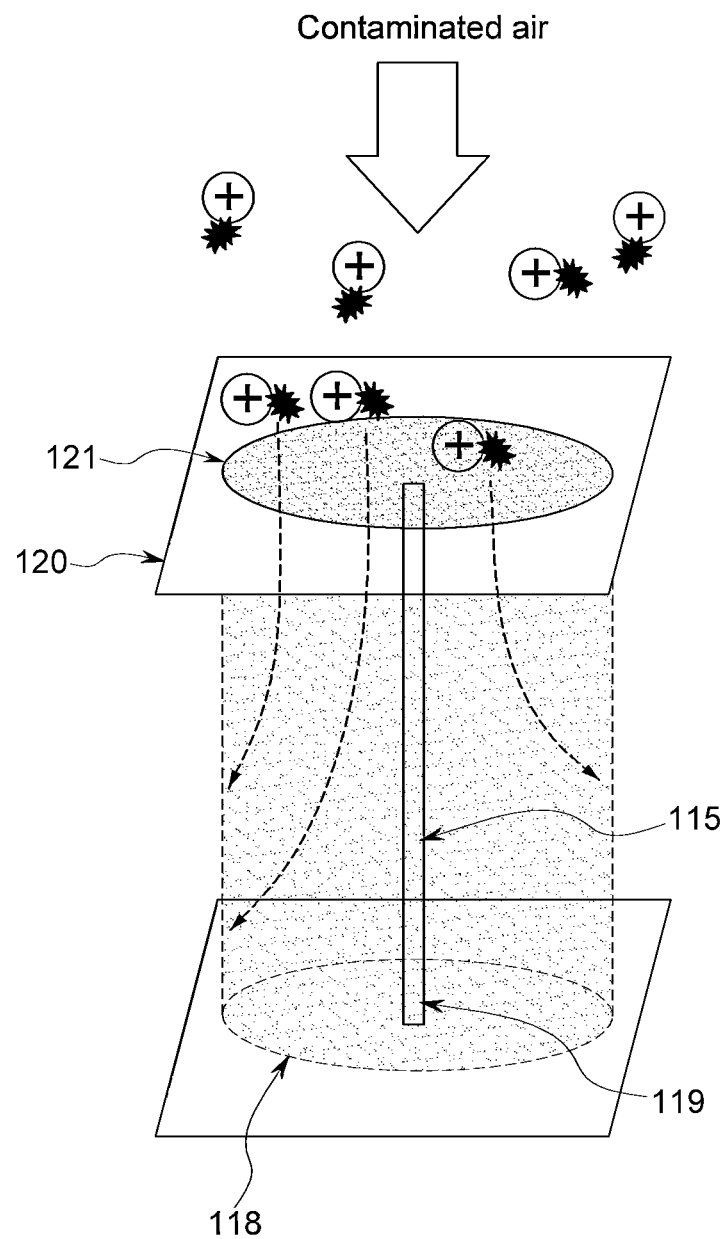
Figure 11:
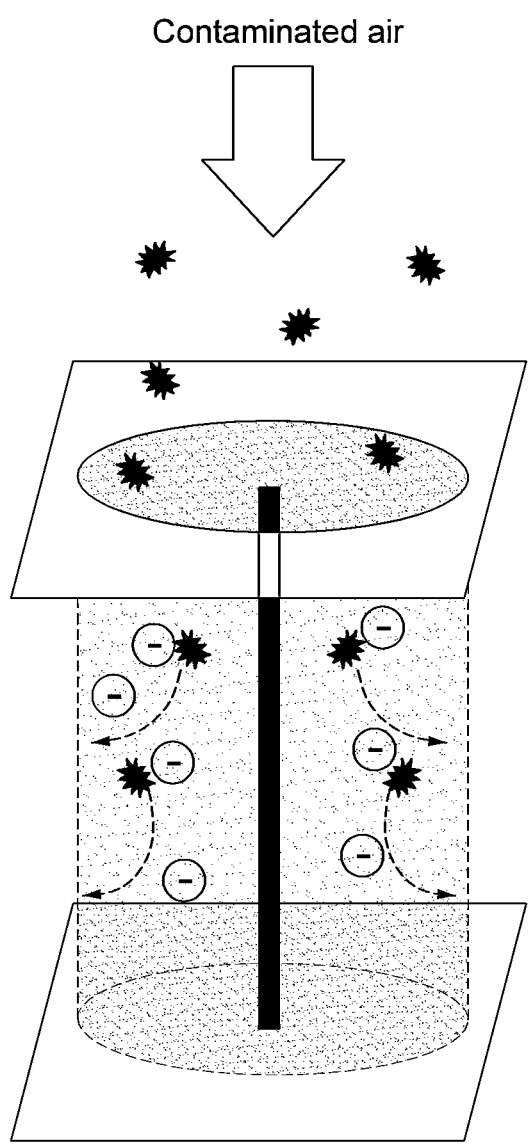
Figure 12:
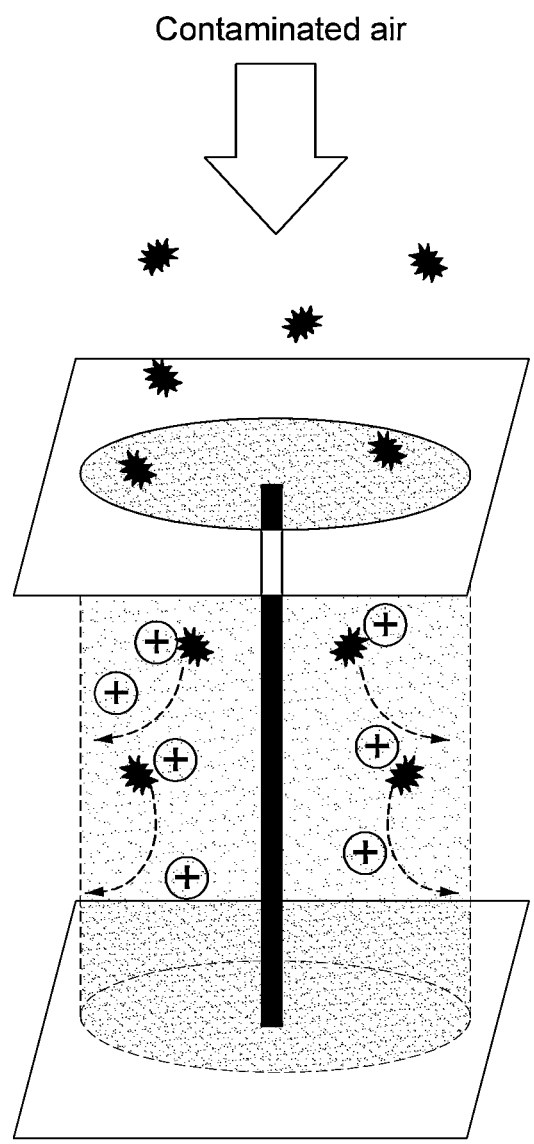

FIGS. 1 and 2 illustrate a conductive filter unit 110 constituting the conductive filter module 100 for collecting fine dust particles, according to an embodiment of the present disclosure.

A conductive filter unit according to an embodiment may include a first electrode cap; a second electrode cap; a conductive filter connecting the first electrode cap and the second electrode cap to each other and forming an inner space between the first electrode cap and the second electrode cap; and an electrode rod including a conductive member protruding from the second electrode cap to the inner space formed by the conductive filter, and a metal member disposed on at least a portion of a surface of the conductive member.

In the metal member, a metal may include at least one of gold (Au), platinum (Pt), silver (Ag), osmium (Os), iridium (Jr), ruthenium (Ru), palladium (Pd), copper (Cu), zinc (Zn), gallium (Ga), germanium (Ge), nickel (Ni), tin (Sn), lead (Pb), cobalt (Co), manganese (Mn), antimony (Sb), magnesium (Mg), aluminum (Al), iron (Fe), indium (In), silicon (Si), chromium (Cr), titanium (Ti), vanadium (V), lanthanum (La), cerium (Ce), tungsten (W), tungsten alloy, molybdenum (Mo), molybdenum alloy, and tungsten-molybdenum alloy.

In the present disclosure, as illustrated in FIGS. 1 and 2 of the accompanying drawings, it may be appreciated that the conductive filter unit 110 is included to achieve high-efficiency dust collection by using a conductive filter that may be used to remove fine dust through a filtration scheme and an electric dust collection scheme.

To achieve high-efficiency fine dust collection by using the conductive filter material, the conductive filter may be positioned across a relatively large area in a limited space, and it is common to use a bent filter to install a filter with a larger area. As the conductive filter 111, any material that has a filter structure and allows electricity to pass may be used.

For reference, the filter structure is a structure composed of appropriate pores and a support and refers to an object having a structure that allows a fluid including particulate matter to pass through, while some or all of the particulate matter is attached to the support and removed, and the fluid passes through and is discharged through the pores.

In order to satisfy the flexibility required for transformation such as bending and curving of the conductive filter, it is preferable that the filter is made of polymer, natural yarn, glass fiber, paper and the like, rather than a metal filter in a bulk state and that the filter that may secure flexibility is coated with a conductive material In addition, to achieve high-efficiency fine dust collection by using the conductive filter material, it is preferable that an area of an electrode made of a highly conductive material that contacts the filter is large so that uniform voltage may be applied throughout the entire area of the conductive filter, rather than applying a voltage to a part of the conductive filter.

In the present disclosure, the conductive filter unit 110 capable of implementing a large filtration area in a relatively narrow volume may be provided by winding the conductive filter 111 in a cylindrical shape having a predetermined diameter.

In addition, the conductive filter unit 110 may include, at one of upper and lower portions of the conductive filter 111, a first electrode cap 112 which is in a ring shape and has a predetermined-shaped opening to allow air containing fine dust to be introduced between the conductive filter 111 and the electrode rod 115, and may include, at the other of the upper and lower portions thereof, a second electrode cap 113 which is installed with an electrode rod and sealed to prevent air from being introduced.

In addition, it is preferable that an electrode made of a conductive material is installed at the first electrode cap 112 or the first electrode cap 112 itself is made of a conductive material so that a high voltage may be applied to the conductive filter 111. The conductive filter 111 is formed into a cylindrical shape by winding it in close contact with the first electrode cap 112 so as to contact an electrode of the first electrode cap 112, and the conductive filter 111 and the first electrode cap 112 are in close contact with each other completely by an adhesive material, thereby ensuring a high voltage to be applied perfectly. In such an embodiment, an air introduced into the conductive filter 111 is prevented from escaping between the first electrode cap 112 and the conductive filter 111.

In addition, the second electrode cap 113 seals a lower portion of the conductive filter 111, secures the electrode rod 115, and tightly secures the lower portion of the conductive filter 111. That is, similar to the first electrode cap 112, the lower portion of the conductive filter 111 is completely in close contact with the second electrode cap 113 to be wound therearound, and is sealed with an adhesive material to prevent air from escaping between the second electrode cap 113 and the conductive filter 111.

According to an embodiment of the present disclosure, since the lower portion of the conductive filter 111 is sealed by the second electrode cap 113, the second electrode cap 113 may serve to secure the electrode rod 115. In such an embodiment, the second electrode cap 113 may have a structure in which the conductive filter 111 is short-circuited from the electrode rod 115 such that an electric field is formed between the conductive filter 111 and the electrode rod 115.

In addition, the conductive filter unit 110 according to an embodiment of the present disclosure may include a support 114, which may connect the first electrode cap 112 and the second electrode cap 113 and may also hold the conductive filter, and the conductive filter 111 in a cylindrical shape wound around the support 114.

In the highly efficient fine dust collection using the conductive filter 111 according to the present disclosure, all air introduced into the fine dust removal system 10 may pass through the filter, and to this end, bonding between the filter and the support that holds the filter may be made tightly so that an air introduced into the filter may pass through the filter without external leakage. Accordingly, the conductive filter 111 wound around the support 114 may be rolled in a cylindrical shape and opposite ends of the filter meeting each other may be completely attached by using an adhesive material so that an air may not leak therebetween.

In addition, in the conductive filter unit 110, by disposing the electrode rod 115 protruding from the center of the second electrode cap 113 to the inner space of the conductive filter 111 wound in a cylindrical shape, a uniform electric field may be formed between the electrode rod 115 and an inner surface of the filter in the conductive filter 111.

The electric field between the conductive filter 111 and the electrode rod 115 serves a key role in allowing the fine dust introduced into the conductive filter 111 to be collected in the conductive filter with high efficiency.

In order to form a uniform electric field between the conductive filter 111 and the electrode rod 115, an electrode may be formed at the first electrode cap 112 so that a high voltage may be applied to the conductive filter 111, and the electrode rod 115 protruding into the inner space of the conductive filter 111 may include an electrode that is grounded or applied with a voltage having a polarity opposite to that of the voltage applied to the filter.

In addition, the metal member 115b disposed on a portion of a surface of the conductive member 115a may include a metal fiber and a powder-shaped metal fiber for generating a large amount of ions between the particle charging device and the conductive filter. The metal fiber may have an average longitudinal length in a range from 1 millimeter (mm) to 300 centimeters (cm), and the powder-shaped metal fibers may have an average particle diameter in a range from 1 micrometer (μm) to 1000 μm.

In the metal fiber, a metal may include at least one of gold (Au), platinum (Pt), silver (Ag), osmium (Os), iridium (Jr), ruthenium (Ru), palladium (Pd), copper (Cu), zinc (Zn), gallium (Ga), germanium (Ge), nickel (Ni), tin (Sn), lead (Pb), cobalt (Co), manganese (Mn), antimony (Sb), magnesium (Mg), aluminum (Al), iron (Fe), indium (In), silicon (Si), chromium (Cr), titanium (Ti), vanadium (V), lanthanum (La), cerium (Ce), tungsten (W), tungsten alloy, molybdenum (Mo), molybdenum alloy, and tungsten-molybdenum alloy.

In the case of the conductive filter unit in which the electrode rod 115 including the metal member 115b disposed on the surface of the conductive member 115a is used, a high voltage having a polarity equal to that of the high voltage applied to the particle charging device is also applied to the conductive member 115a, and the conductive filter is grounded or applied with a voltage having a polarity opposite to the polarity of the high voltage applied to the conductive member 115a.

When a separate particle charging device is not used, a negative or positive high voltage is applied to the electrode rod 115 in which the metal member 115b is disposed on the surface of the conductive member 115a, and the conductive filter is grounded or applied with a high voltage having a polarity opposite to that of the high voltage applied to the conductive member 115a of the electrode rod.

In the case of the conductive filter unit in which the electrode rod 115 including the metal member 115b disposed on the surface of the conductive member 115a is used as the electrode rod 115, it serves to improve the charge rate of fine dust particles by inducing a large amount of ions to be generated, in addition to forming of an electric field that induces charged particles to be well collected in the conductive filter. In particular, in such an embodiment, fine dust that moves in a direction perpendicular to a movement path of ions generated between the conductive member 115a and the conductive filter, that is, a path of ions generated in the conductive member and moving to the conductive filter, may significantly improve the charge rate of particles by increasing the probability of colliding with ions. In addition, the movement direction of the fine dust particles is changed to the direction of the conductive filter due to collision with ions, such that the collecting efficiency due to the electrostatic force may be greatly improved.

According to an embodiment of the present disclosure, when a cylindrical filter module including an electrode rod having no metal member disposed on the surface thereof is used without a separate particle charging device, and a voltage is not applied to the electrode rod and the conductive filter is only grounded, a fine dust removal rate was an average of 6.7%. On the other hand, in the cylindrical filter modules including the electrode rods in which a metal member cut to a length of 0.5 cm to 7 cm, a metal member cut to a length of 1 mm to 3 mm, and a powder-shaped metal having a particle size in a range of 10 μm to 30 μm are disposed on surfaces of electrode members, respectively, when a high DC voltage in a range of −1 kV to −6 kV is applied to the electrode rod and the conductive filter is grounded, respective fine dust removal efficiencies were 90 to 100%, showing excellent fine dust removal efficiency.

Next, the conductive filter module 100 of the present disclosure will be described.

The conductive filter module 100 may include a filter securing plate 120 to mount thereon and secure the plurality of conductive filter units 110 described above, as illustrated in FIGS. 3 to 8.

The filter securing plate 120 may include as many air inlets 121 as the number of the conductive filter units 110 to be connected to mount the conductive filter unit 110.

The air inlet 121 may be formed such that the first electrode cap 112 of the conductive filter unit 110 may be connected thereto, and the conductive filter 111, the first electrode cap 112 and the filter securing plate 120 may not be electrically short-circuited so as to apply a high voltage to the conductive filter 111.

In this case, FIGS. 5 to 8 illustrate a method in which a high voltage is applied to the conductive filter module 100 including the filter securing plate 120 on which the plurality of conductive filter units 110 are mounted according to an embodiment of the present disclosure.

In the present disclosure, a high voltage in a range of 1 to 20 [kV] is applied to the conductive filter module 100 in order to form an electric field required to remove fine dust. The filter securing plate 120, the first electrode cap 112, and the conductive filter 111 may be connected to each other in a structure that they are not electrically short-circuited so that a high voltage is applied to the conductive filter 111. In addition, the electrode rod 115 may be grounded or applied with a high voltage having a polarity opposite to the voltage applied to the filter securing plate 120 so that a uniform electric field is formed between the conductive filter 111 and the electrode rod 115.

In an embodiment, when the electrode rod 115 in which the metal member 115b is disposed on the surface of the electrode member 115a is used, the conductive filter 111 may be grounded or applied with a high voltage having a polarity opposite to the voltage applied to the electrode rod 115. Accordingly, a large amount of ions may be generated from the electrode member 115a, and an electric field formed between the conductive filter and the electrode rod may also be strengthened to maximize the collection rate of fine dust particles on the conductive filter.

Meanwhile, FIGS. 9 to 12 illustrate a mechanism for collecting fine dust when fine dust is introduced into the conductive filter unit 110, according to an embodiment of the present disclosure.

In the present disclosure, when fine dust is introduced into the conductive filter unit 110, a filtering dust collection mechanism and an electric dust collection mechanism may be such that fine dust particles charged to a polarity opposite to a polarity 116 or 118 of a voltage applied to the conductive filter, in an electric field region formed between an inner wall of the conductive filter 111 and the electrode rod 115, may pass through the conductive filter 111 and be collected to a unit fiber surface constituting the conductive filter.

In addition, a filtering dust collection mechanism and an electric dust collection mechanism may be such that the electrode rod is applied with a voltage having a polarity 117 or 119 equal to a polarity of the fine dust, and the fine dust having the same polarity may pass through the conductive filter 111 and be collected to a unit fiber surface constituting the conductive filter.

Accordingly, in the conductive filter module 100 according to an embodiment of the present disclosure, it is important that contaminated air containing fine dust is introduced through the first electrode cap 112 to which the conductive filter 111 is connected, and the fine dust is introduced into an electric field region formed between the conductive filter 111 and the electrode rod 115.

Hereinafter, a fine dust removal system 10 provided with the conductive filter module 100 of the present disclosure will be described.

In an embodiment, the fine dust removal system provided with the conductive filter module 100 may generate a large amount of ions, upon application of a high voltage, by using the electrode rod 115 in which the metal member 115b is disposed on the surface of the electrode member 115a, and the fine dust removal system may not include a particle charging device.

Figure 13:
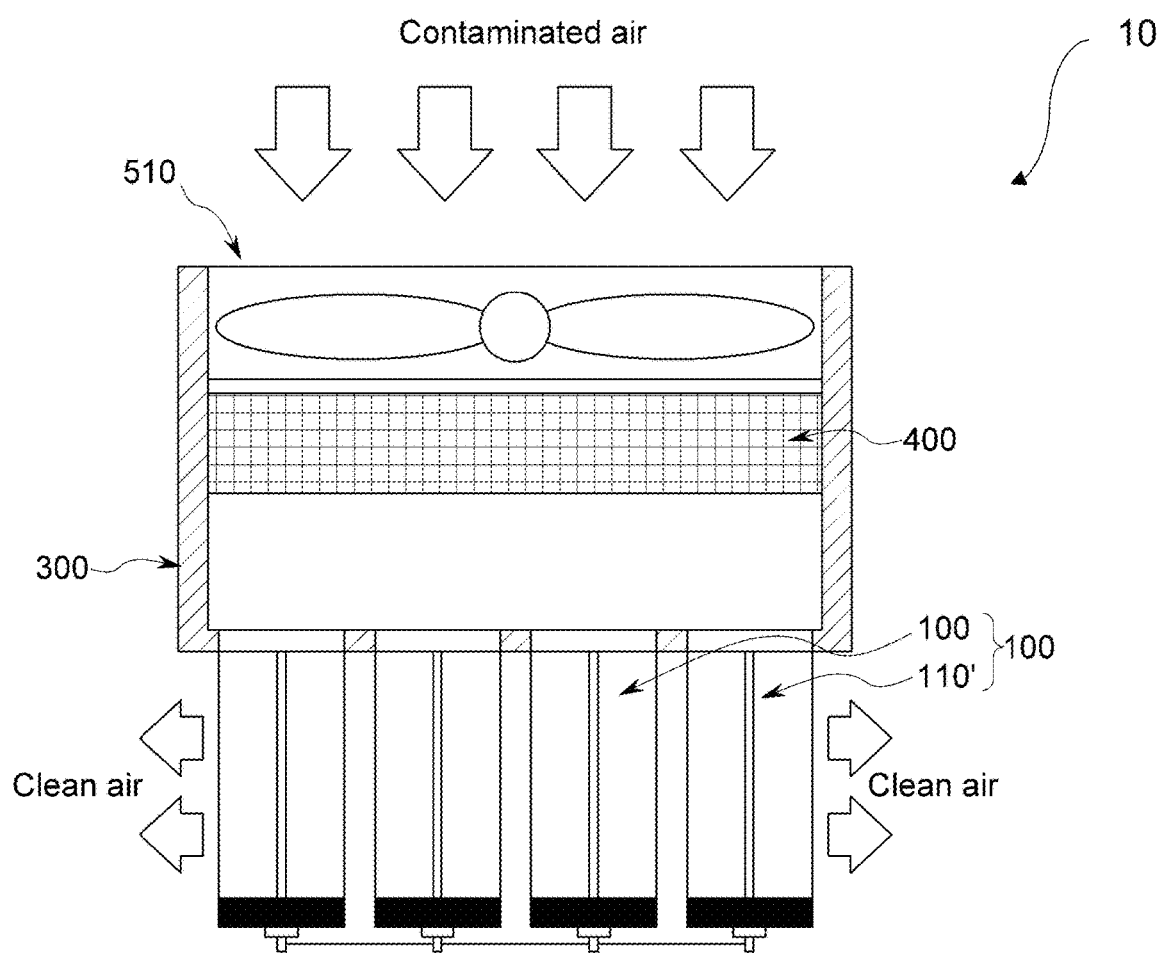
FIGS. 13 to 16 are schematic diagrams illustrating a fine dust removal system 10 according to another embodiment of the present disclosure.

As described above, in the present disclosure, it is highly important that contaminated air containing fine dust is introduced and fine dust is introduced into the electric field region formed between the conductive filter 111 and the electrode rod 115. To this end, as illustrated in FIG. 13, in the fine dust removal system 10 provided with the conductive filter module 100 according to an embodiment, a pressurizing fan 510 is provided over the first electrode cap 112 of the conductive filter module 100, and a housing 300 having a sealed structure may be installed to prevent air outflow and inflow therearound.

The contaminated air containing fine dust is introduced into a channel through the pressurized fan 510 toward the conductive filter module 100. In such an embodiment, the fine dust present in the introduced air passes through the particle charging device 400 and is electrically charged. The air containing charged fine dust may all be introduced to a portion between the conductive filter 111 and the electrode rod 115 through the first electrode cap 112 due to the housing 300 formed as a sealing wall between the pressurizing fan 510 and the filter securing plate 120 for securing the conductive filter unit 110, and most of the introduced, charged fine dust is collected by an inner wall of the conductive filter. In such an embodiment, a functional filter for removing gaseous pollutants or odors present in the air may be additionally installed at a front end or a rear end of the particle charging device 400. In such an embodiment, the rear end refers to all portions of the rear end of the particle charging device 400 based on a flow direction of air.

Figure 14:
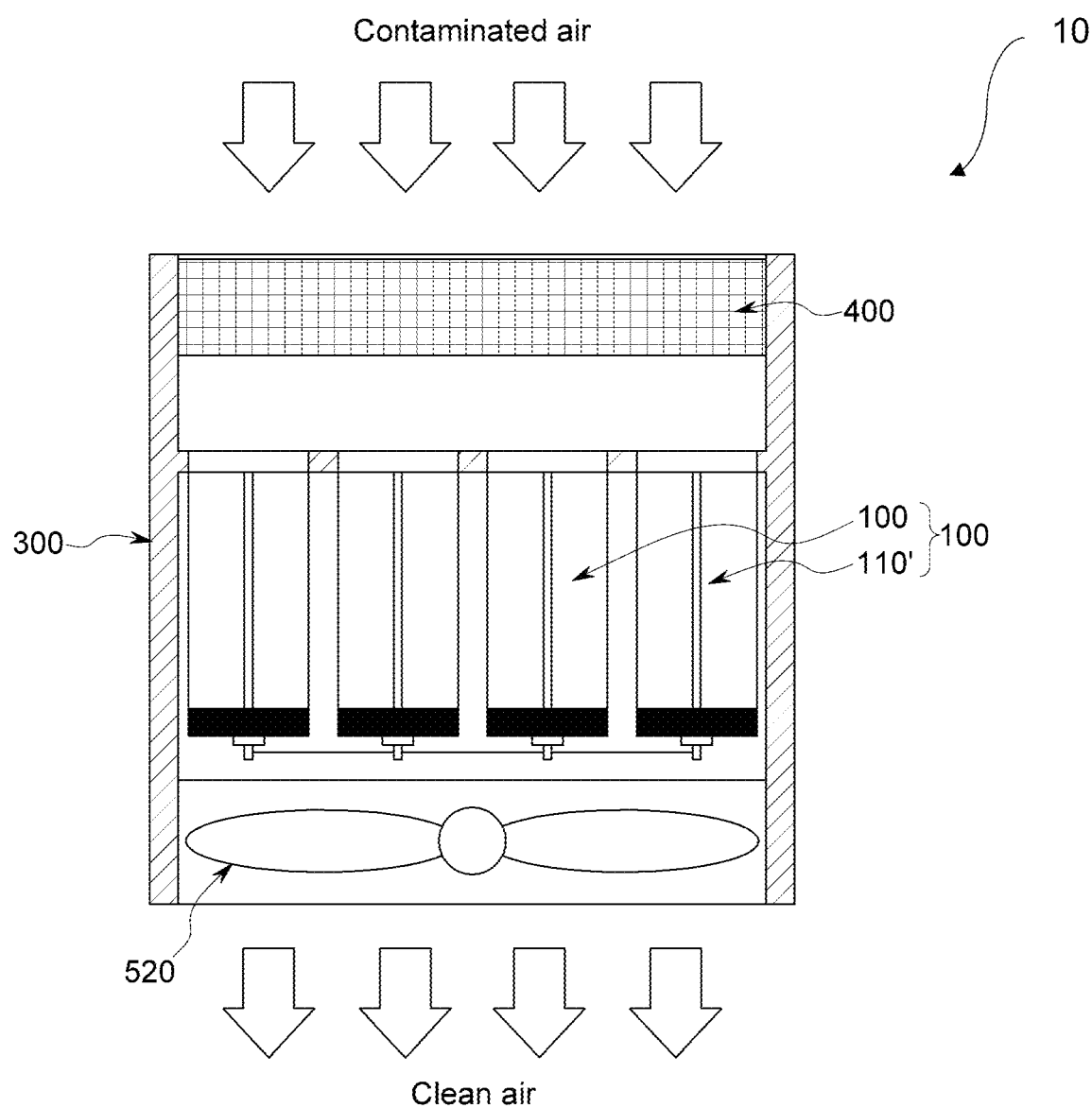

In a fine dust removal system 10 provided with the conductive filter module 100 according to another embodiment, as illustrated in FIG. 14, an induction fan 520 may be positioned below the second electrode cap 113, and the housing 300 having a sealed structure may be installed to prevent air leakage and inflow therearound.

In addition, the housing 300 having a sealed structure may be extended and installed to be connected to the particle charging device 400 so that contaminated air containing fine dust may pass through the particle charging device 400.

In such an embodiment, when the induction fan 520 is driven, a negative pressure is maintained inside the housing 300 having a sealed structure, and contaminated air containing fine dust is introduced into the particle charging device 400 communicating with the outside. In such an embodiment, the fine dust present in the introduced contaminated air passes through the particle charging device 400 and is electrically charged.

The contaminated air containing the charged fine dust as described above may all be introduced to a portion between the conductive filter 111 and the electrode rod 115 through the first electrode cap 112 due to the housing 300 having the sealed structure, such that most of the charged fine dust may be collected on the inner wall of the conductive filter. In such an embodiment, a functional filter (not illustrated) for removing gaseous pollutants or odors present in the air may be additionally installed at a front end or a rear end of the particle charging device 400.

Figure 15:
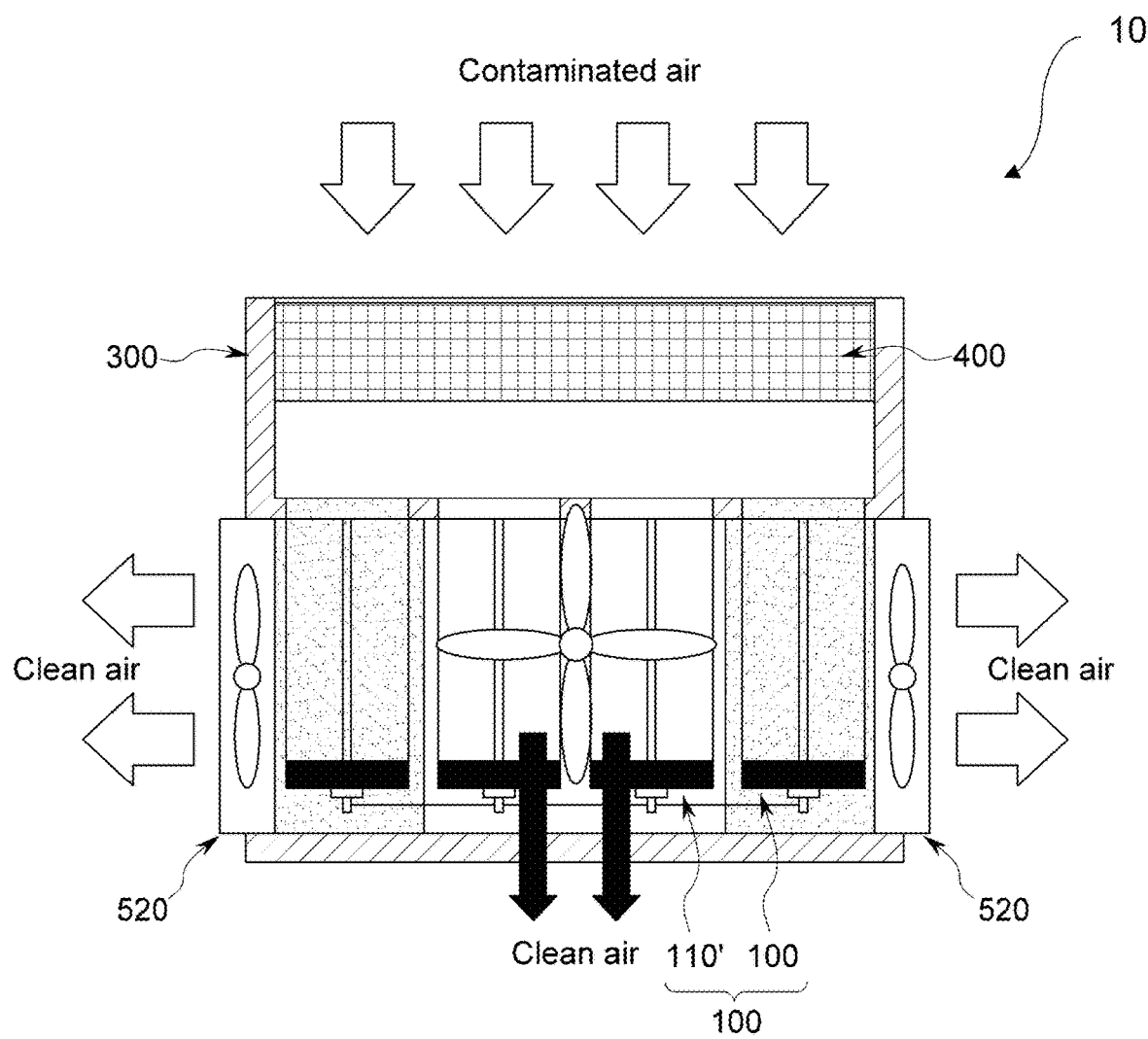

In a fine dust removal system 10 provided with the conductive filter module 100 according to another embodiment of the present disclosure, as illustrated in FIG. 15, the induction fans 520 may be positioned on each of four directions of the quadrangle-shaped module arranged with the conductive filters 111, and the housing 300 having a sealed structure may be installed such that a portion not blocked by the induction fan is prevented from air leakage and inflow.

In addition, in order to allow all air to be introduced into the particle charging device 400, the housing 300 having a structure to seal the periphery of the particle charging device 400 may be installed at the air inlet 121.

In such an embodiment, when the induction fan 520 is driven, a negative pressure is maintained inside the housing 300 having the sealed structure, and air containing fine dust is introduced into the particle charging device 400 communicating with the outside. In such an embodiment, the fine dust present in the introduced contaminated air passes through the particle charging device 400 and is electrically charged. The air containing the charged fine dust may all be introduced to a portion between the conductive filter 111 and the electrode rod 115 through the first electrode cap 112 due to the housing 300 having the sealed structure, such that most of the charged fine dust may be collected on the inner wall of the conductive filter. In such an embodiment, a functional filter for removing gaseous pollutants or odors present in the air may be additionally installed at a front end or a rear end of the particle charging device 400.

Figure 16:
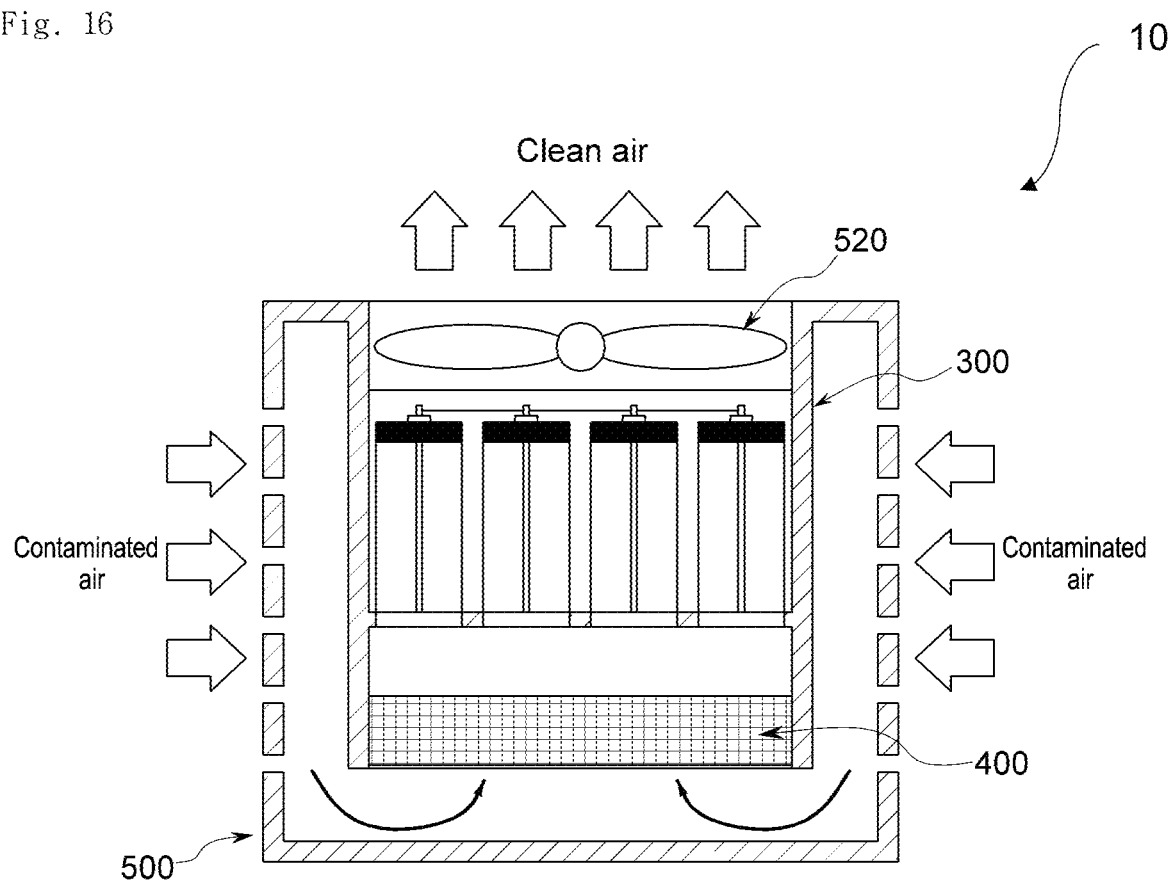

In a fine dust removal system 10 provided with the conductive filter module 100 according to another embodiment of the present disclosure, as illustrated in FIG. 16, in a state that the induction fan 520 is positioned with a gap over the quadrangle-shaped module arranged with the conductive filters 111, and that the particle charging device 400 is positioned with a gap at a lower portion thereof, the housing 300 which has a sealed structure to substantially prevent air leakage and inflow through a path between the conductive filter 111 and the induction fan 520 and a path between the conductive filter 111 and the particle charging device 400, and an outer housing 500 enclosing the outside of the housing 300 may be further provided.

In such an embodiment, in the structure of the quadrangle-shaped module in which the conductive filters 111 are arranged, the first electrode cap 112 may be positioned at an upper portion and the second electrode cap 113 may be positioned at a lower portion, but the first electrode cap 112 may be positioned at a lower portion and the second electrode cap 113 may be positioned at an upper portion.

INDUSTRIAL AVAILABILITY

The conductive filter unit according to an embodiment of the present disclosure may be used in place of fine dust removing devices or fine dust removing filters included in air purifiers used at homes and industries.

The invention claimed is:

1. A fine dust removal system comprising:
a conductive filter module comprising a filter securing plate comprising at least one open air inlet, and a conductive filter unit installed at the filter securing plate, the conductive filter unit comprising:
a first electrode cap;
a second electrode cap;
a conductive filter that connects the first electrode cap and the second electrode cap to each other, and has a filter structure, and forms an inner space between the first electrode cap and the second electrode cap, and is coated with conductive material; and
an electrode rod comprising a conductive member protruding from the second electrode cap to the inner space formed by the conductive filter, and a metal member disposed at at least a portion of a surface of the conductive member,
wherein the second electrode cap seals a lower portion of the conductive filter and secures the electrode rod;
a housing, the conductive filter module disposed in the housing in a direction of an inflow of a contaminated air or in a direction of a discharging of a clean air;
a fan disposed in the housing in the direction of an inflow of a contaminated air or in the direction of a discharging of a clean air, wherein the fan induces a flow of air; and
a particle charging device disposed in the housing in the direction of an inflow of a contaminated air or in the direction of a discharging of a clean air.

2. A fine dust removal system comprising:
a conductive filter module comprising a filter securing plate comprising at least one open air inlet, and a conductive filter unit installed at the filter securing plate, the conductive filter unit comprising:
a first electrode cap;
a second electrode cap;
a conductive filter that connects the first electrode cap and the second electrode cap to each other, and has a filter structure, and forms an inner space between the first electrode cap and the second electrode cap, and is coated with conductive material; and
an electrode rod comprising a conductive member protruding from the second electrode cap to the inner space formed by the conductive filter, and a metal member disposed at at least a portion of a surface of the conductive member,
wherein the second electrode cap seals a lower portion of the conductive filter and secures the electrode rod;
a housing, the conductive filter module disposed in the housing in a direction of an inflow of a contaminated air or in a direction of a discharging of a clean air; and
a fan disposed in the housing in the direction of an inflow of a contaminated air or in the direction of a discharging of a clean air, wherein the fan induces a flow of air,
wherein the housing in which the conductive filter module and the fan are disposed is disposed in an outer housing in which a contaminated air inlet and a clean air outlet are correspondingly provided.

3. The fine dust removal system of claim 1, wherein the housing in which the particle charging device, the conductive filter module and the fan are disposed is disposed in an outer housing in which a contaminated air inlet and a clean air outlet are correspondingly provided.

4. The fine dust removal system of claim 3, wherein a first space is formed between one surface of the housing and one inner surface of the outer housing provided with the contaminated air inlet,
a second space is formed between another surface of the housing and another inner surface of the outer housing provided with the clean air outlet,
a communication path is formed at a lower portion of the another surface of the housing,
the particle charging device is disposed at an upper portion of the one surface of the housing corresponding to the contaminated air inlet,
the conductive filter module is disposed and secured in a direct downward direction from an inner middle portion of the housing, and
the fan is provided in a space between the communication path at the lower portion of the another surface of the housing and the clean air outlet.

5. The fine dust removal system of claim 2, wherein the outer housing is formed such that the clean air outlet is secured at an upper or a lower opening of a window to face toward an indoor space.

6. The fine dust removal system of claim 2, wherein the outer housing is formed such that the clean air outlet is secured at a window frame of a window to face toward an indoor space.

7. The fine dust removal system of claim 6, wherein the outer housing comprises the contaminated air inlet as a first contaminated air inlet and further comprises a second contaminated air inlet, the first and the second contaminated air inlets disposed at two different positions, and a contaminated air introduced by the first contaminated air inlet and the second contaminated air inlet is selected to be an outdoor air or an indoor air.

8. The fine dust removal system of claim 7, further comprising a damper disposed at each of the first contaminated air inlet and the second contaminated air inlet.

9. The fine dust removal system of claim 2, wherein the outer housing is in the form of a stand on a secured base or a rotating base rotated by a motor.

10. The fine dust removal system of claim 9, wherein an air circulating fan that serves to circulate indoor air is separately provided at an upper or a lower portion of the outer housing.

* * * * *